United States Patent [19]

Webb

[11] Patent Number: 4,563,846
[45] Date of Patent: Jan. 14, 1986

[54] MOLDED WINDOW ASSEMBLY
[75] Inventor: Dale P. Webb, Conneaut, Ohio
[73] Assignee: Webb Manufacturing, Inc., Conneaut, Ohio
[21] Appl. No.: 472,946
[22] Filed: Mar. 7, 1983
[51] Int. Cl.⁴ .............................................. E06B 3/00
[52] U.S. Cl. ..................................... 52/208; 52/213; 52/788
[58] Field of Search ............... 52/208, 204, 211, 213, 52/788, 398; 49/DIG. 2

[56] References Cited

U.S. PATENT DOCUMENTS

| | | | |
|---|---|---|---|
| 2,733,787 | 2/1956 | Morra | 52/213 |
| 2,791,004 | 5/1957 | Sullivan | 52/213 |
| 4,125,976 | 11/1978 | Carlsson et al. | 52/217 |
| 4,195,456 | 4/1978 | Hickman et al. | 52/213 |
| 4,420,919 | 12/1983 | Weber | 52/204 |

Primary Examiner—Carl D. Friedman
Assistant Examiner—Creighton Smith
Attorney, Agent, or Firm—Renner, Otto, Boisselle & Lyon

[57] ABSTRACT

A window assembly includes an integrally molded sash, sill, frame and exterior trim unit and wooden interior trim parts fastened to the interior side thereof. An insert such as glazing material is held in place by a wooden interior sash which presses the insert against a peripheral surface of the molded unit. The interior sash is secured in place by screws driven into bosses surrounding the insert. An integral nailing flange extends outward from the molded unit and forms a rigid flashing which is intended to fit against the sheathing of an exterior wall and subsequently covered by the exterior siding. The nailing flange serves to locate the window assembly in the wall, and has holes therein through which nails may be driven to hold the window assembly in place.

18 Claims, 4 Drawing Figures

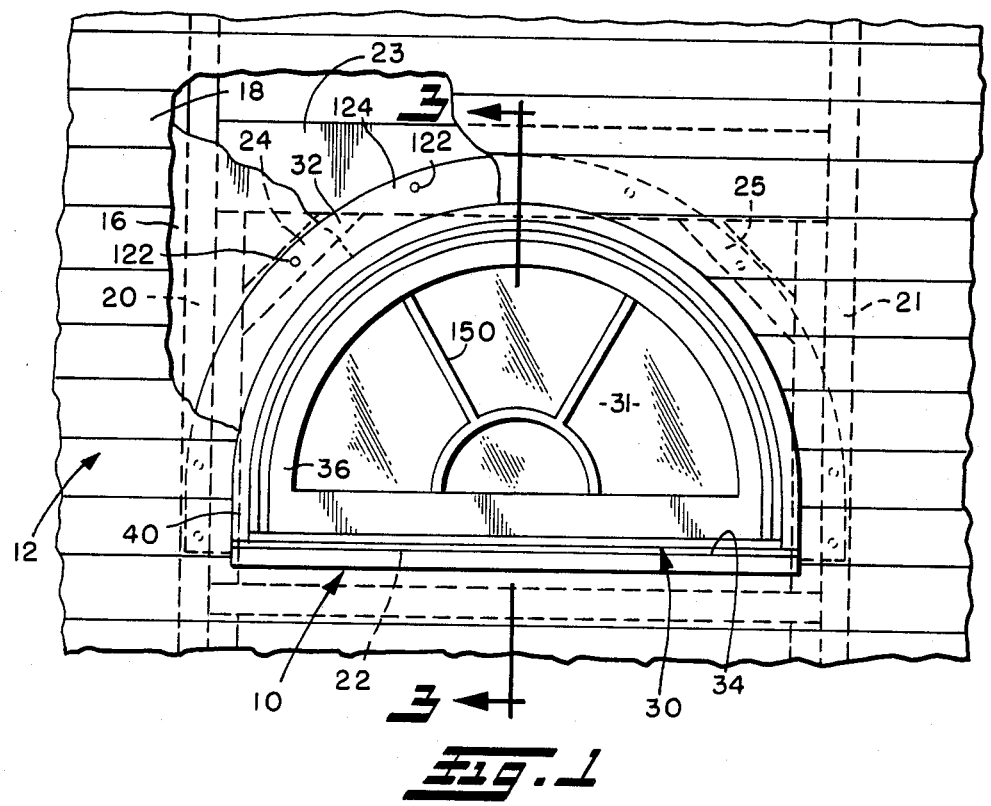
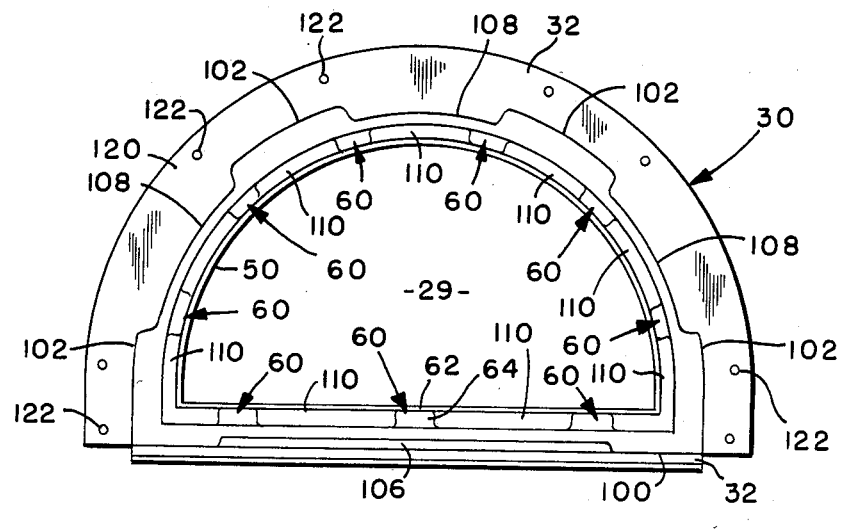

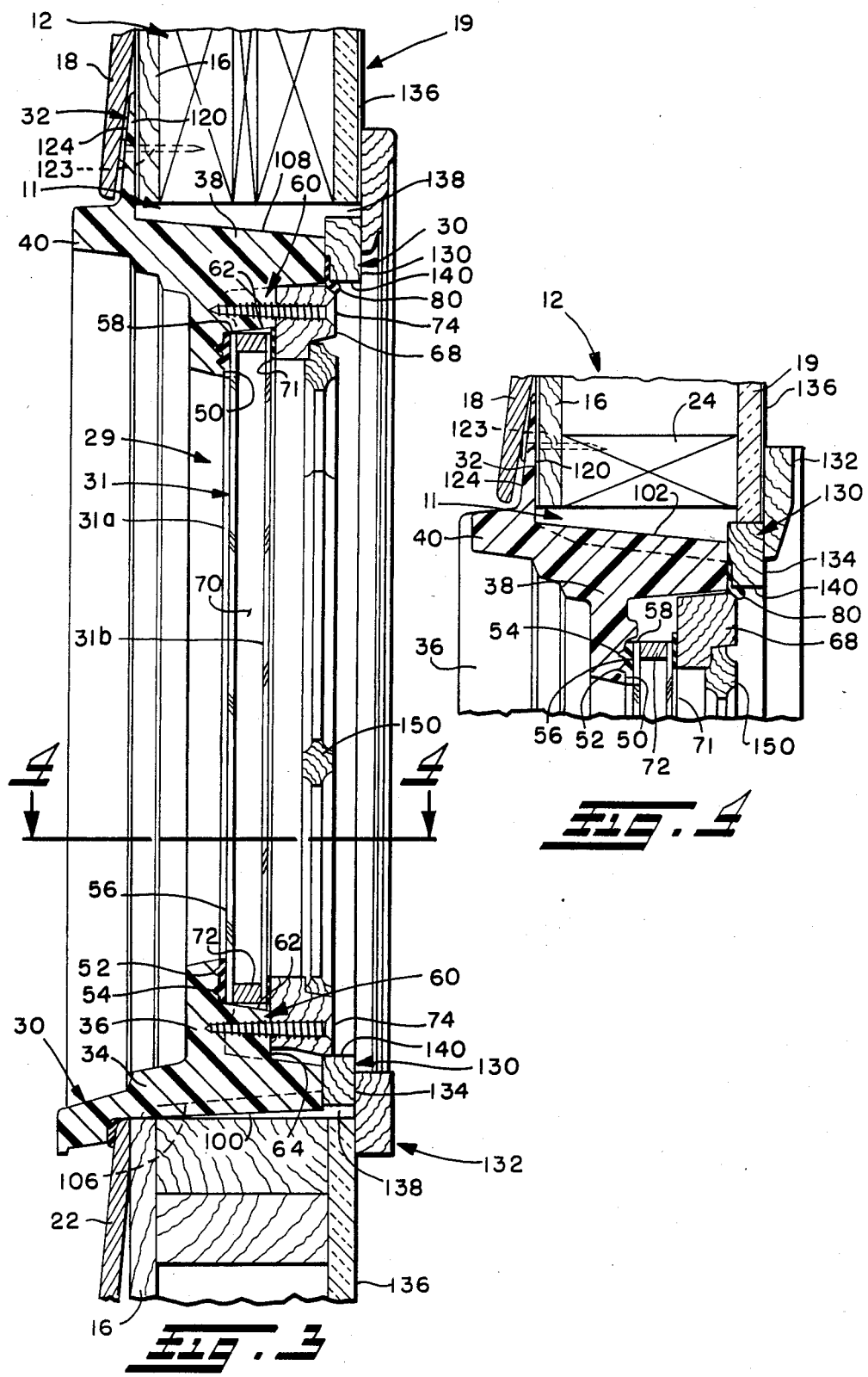

MOLDED WINDOW ASSEMBLY

BACKGROUND OF THE INVENTION

The present invention relates to architectural window assemblies and the like and more particularly to the construction of window frames and sashes and to sealing the joint between the window frame and a building upon installation of the window assembly.

Windows used both in new construction and in the replacement market increasingly incorporate plastic materials. For example most commercially available wood windows now may be purchased with a weather impervious vinyl plastic coating on all exposed exterior surfaces. Further, it is generally known to form windows entirely from plastic, particularly vinyl, where the components of the window are extruded linear forms which are subsequently cut and assembled to form window sashes, frames, etc. In this regard, attention is drawn to an article appearing in "Modern Plastics", November 1982, which is incorporated herein by reference. However, to applicant's knowledge, shapes other than rectangular or rectilinear windows have not been made of plastic, and windows with curved sashes and frames continue to be manufactured from wood in the traditional, labor-intensive manner by skilled and highly paid craftsmen.

In new construction, windows are installed after studs and sheathing have been put up. The finish interior wall, such as lath and plaster or wallboard or paneling, may also be in place prior to such installation. The windows are installed in a "rough opening" bounded by 2×4's or the like, and are usually fastened in place with nails or screws, although construction adhesives can also be used.

With some windows, it may be possible to fasten them in place from the interior of the building. Where nails must be driven from the exterior, the exposed nailheads are sometimes covered with exterior trim pieces. When vinyl coated exterior window pieces are used, it is undesirable to drive nails from the outside, as any nail hole violates the integrity of the protective vinyl coating. Even where the nails which secure the window frame in place can be covered with trim, the trim must somehow be fastened in place. The use of nails for this purpose, as is traditional, prevents the trim pieces from being vinyl coated.

Once the window is fastened in place, a seal must be effected between the window and the wall. Usually flashing is installed between the window and the sheathing, and various caulking compounds may also be used. Thereafter, the siding or other finish exterior wall covering is installed.

SUMMARY OF THE INVENTION

The present invention provides a new and improved architectural window assembly in which the sash, sill, frame and exterior trim are integrally molded as a unit out of a suitable plastic such as urethane which may be formed utilizing a reaction injection molded (RIM) process. A wooden interior sash holds an insert such as glazing material (either glass or plastic) in the unit by pressing it against a peripheral surface in the sash, sill, frame and trim unit. The unit also has bosses against which the interior sash is pressed and into which fasteners, e.g., screws, are driven to hold the interior sash in place.

It is a further feature of the present invention that the window assembly is provided with a rigid nailing flange integrally molded with the sash, sill, frame and trim unit and which extends outward therefrom. The flange is continuous over at least the top half of the window unit and fits between the siding and the sheathing of the exterior wall. The flange positions the window assembly in the rough opening and is provided with nail holes through which nails are driven to fasten the window assembly to the wall. Since the flange is ultimately covered by the siding or other exterior finishing material, no damage is done to the exposed exterior surfaces of the window assembly by nailing the window assembly in place. Therefore, it is possible to apply during the manufacturing process a long lasting surface finish on such exterior surface. No vinyl coating is required since the urethane does not degrade from exposure to the weather.

The flange also serves as a weatherstripping or flashing. Because the flange extends around at least the top half of the perimeter of the sash, sill, frame, and trim unit, it may be effectively utilized to prevent the entry of water into the interior of the building. The RIM molding process makes it possible to form sash, sill, frame and trim units of any configuration, but it is particularly advantageous for non-rectilinear shapes such as semicircular, hexagonal, circular, octagonal, etc.

The invention, then, comprises the features hereinafter fully described and particularly pointed out in the claims, the following description and annexed drawings setting forth in detail a certain illustrative embodiment of the invention, this being indicative, however, of but one of the various ways in which the principles of the invention may be embodied.

BRIEF DESCRIPTION OF THE DRAWINGS

In the annexed drawings:

FIG. 1 is an exterior elevation view, partly cut away, of a window assembly constructed in accordance with the present invention and installed in an exterior wall;

FIG. 2 is an interior view of a portion of the window assembly of FIG. 1;

FIG. 3 is an enlarged fragmentary vertical section through the window assembly and wall of FIG. 1, taken along the plane of the line 3—3 thereof; and FIG. 4 is a partial section through the window assembly and wall of FIG. 3 looking in the direction of arrows 4—4 of FIG. 3.

DESCRIPTION OF THE PREFERRED EMBODIMENT

FIG. 1 illustrates an architectural window assembly 10 or the like with a semicircular shape. The window assembly 10 is intended for installation in a conventional exterior wall 12 formed of the usual studs with sheathing 16 over the studs, and siding 18 over the sheathing to form the exterior surface. Of course, the siding 18 could be replaced with any of the conventional exterior surfaces such as bricks, shingles, stucco, etc. The interior finish wall 19 (FIGS. 3 and 4) of the wall 12 may be lath and plaster, wallboard, paneling, or any other conventional material.

The window assembly 10 (FIG. 1) is intended for installation in a rough opening 11 in the wall 12 (FIG. 2) which may, for example, be defined by vertical 2×4's 20, 21, cross members 22, 23 and diagonal members 24, 25 in a conventional manner. The opening 11 is cut in the wall 12 slightly larger than the frame portion of the window assembly. After the window assembly is in place, the siding 18 is installed. In short, the preparation of the wall 12 prior to installation of the window assembly 10 and the treatment of the wall after installation of the window assembly are entirely conventional.

However, the window assembly 10 is not at all conventional. Such window assembly includes an integrally molded sill, sash, frame, and trim unit 30 which defines an interior opening 29 into which an insert such as glazing material 31 of glass or plastic may be installed. Preferably the glazing material 31 includes two parallel panes 31a and 31b. Additionally, the sill, sash, frame, and trim unit 30 includes a nailing flange 32 extending radially outward from the unit which is used both to position the unit 30 in a rough opening and to seal the installed window assembly 10.

The window assembly 10 is installed in wall 12 of a building structure, and hence the terms interior, exterior, vertical, elevation, and horizontal all relate to the usual and ordinary installation of any window in a generally vertical wall. However, it should be understood that the wall 12 could be inclined. Also the sill portion 34 of the unit 30 need not be horizontal.

The sill, sash, frame, and trim unit 30 (hereinafter "unit 30") is preferably formed of Reaction Injection Molded (RIM) urethane. This method of molding is generally well known, and in the present invention it is preferred to select the reactants and operating conditions to provide a hard, smooth skin over a less dense and softer core. The exterior surfaces after molding may then be coated with a long lasting finish that eliminates the need for painting of the exterior of the unit 30 after installation and will retain an attractive appearance for many years. Additionally, foamed urethane has excellent insulating properties.

The unit 30 (FIGS. 2, 3 and 4) is a unitary structure performing the functions of a sill 34, a sash 36, a frame 38, and exterior trim 40. The sash portion 36 of the unit 30 includes a radially inner perimeter surface 50 which faces axially inwardly toward the interior for positioning the glazing material 31 thereagainst. This surface 50 surrounds the opening 29 in which the glazing material 31 is received and lies in a vertical plane, i.e., it is parallel to the plane of the glazing material 31. The surface 50 may, for example, be approximately one half inch wide and faces the interior so that a marginal portion of the glazing material 31 may be pressed axially outward against it.

A pair of parallel, generally V-shaped, endless grooves 52 and 54 may be provided in the surface 50, each groove desirably extending all the way around surface 50 and being between 1/16 and ⅛ inch deep and equally wide at the surface 50. When the glazing material 31 is installed, caulking or putty 56 may be applied to surface 50 to seal the joint between the surface 50 and the glazing material. The caulking is forced into the grooves 52 and 54 as the glazing material 31 is pressed into place. Thus the surface 50 serves to position the glazing material 31 in a generally vertical plane and prevents it from moving outward from the window 10, while the grooves 52 and 54 accommodate the putty 56 to assure a weather tight seal.

A lip 58 on surface 50 (FIG. 4) positions the outermost pane 31a of glazing material, preventing it from moving sideways or up or down relative to the unit 30. The lip 58 is as nearly perpendicular to the surface 50 as good molding practice will allow. (The slight draft angle provides ease in removing the unit 30 from the mold in which it is made.) The lip 58 desirably extends around the entire perimeter of the opening 29 in which the glazing material 31 fits.

A plurality of bosses 60 (FIGS. 2 and 3) surround the opening 29 and serve two functions. First the bosses 60 have surfaces 62 and 64 which locate the glazing material 31 and the inside, wooden sash 68, respectively. The surfaces 62 are generally perpendicular to the plane of the glazing material 31 and form extensions of the lip 58.

Surfaces 64 (FIG. 3) are parallel to the plane of the glazing material 31 and serve to position the interior wooden sash 68. The glazing material 31 could be a single pane of glass or plastic, in which case the surfaces 64 of the bosses 60 would be parallel to and spaced from the surface 50 by a distance equal to the thickness of a single pane of glazing material plus some clearance for caulking 56. However, it is preferred to provide the window 10 as shown with parallel panes 31a and 31b separated by a space 70. Therefore, the surface 64 is spaced from the surface 50 by a distance equal to two thicknesses of the glazing material 31 plus the dimension of the space 70 plus some clearance for caulking 56 and caulking 71 between the sash 68 and the pane 31b. The space 70 between the panes 31a and 31b is desirably maintained by a semi-rigid sealant 72 which yields slightly when compressed to help assure a tight seal.

The bosses 60 also serve as an anchoring surface for the sash 68. When the glazing material has been installed in the unit 30, the interior sash 68 which surrounds the entire perimeter of the glazing material is positioned inside the unit 30. Thereafter threaded fasteners 74 are driven through the interior sash 68 into each of the bosses 60. Tightening the fasteners 74 draws the sash 68 toward the surface 50 and clamps the glazing material securely in place, forcing the caulking 56 into the grooves 52 and 54 and slightly compressing the sealant 72 and the caulking 71. In this way, a tight seal between the glazing material and the unit 30 is assured. A rubber gasket shown at 80 may also be used to seal the sash 68 to the unit 30.

The unit 30 (FIGS. 2, 3 and 4) includes axially extending exterior surfaces 100 and 102 for positioning the unit 30 within the rough opening 11 in the wall 12. The surfaces 100 are approximately horizontal, extending radially downward from the sill portion 34. The surfaces 102 extend radially outward from the arcuate perimeter of the frame portion 38 of the unit 30 (FIGS. 2 and 4). These surfaces 100 and 102 extend axially at angles just slightly less than 90° to the plane of the glazing material 31 for ease of molding and installation of the unit 30, and provide relatively flat faces against which shims (not shown) may be installed to level accurately and to position the window assembly 10 within the rough opening. The remaining portions of the outer circumference of the window unit 30 may include relieved areas as indicated at 106 and 108 between the exterior surfaces 100 and 102 as well as open areas 110 between the bosses 60 to reduce the weight of the unit 30 and to save material costs.

The nailing flange 32 is integrally molded with the unit 30 and desirably extends radially outward about two to two and a half inches from the radially outermost surface of the trim portion 40 of the unit 30. The flange 32 includes a radially extending interior surface 120 which is generally parallel to the plane of the glazing material 31 and located axially and radially outwardly thereof by a distance determined by standard construction techniques. A plurality of preformed holes 122 are provided in the flange 32 (FIGS. 1 and 2) which permit screws or nails 123 to be driven through the flange and into the underlying sheathing 16 and/or studs to secure the window assembly 10 in place. The nail holes 122, being located radially outward from the trim portion 40 (FIGS. 1 and 3) of the unit 30, will be covered by siding 18 or other exterior surface treatment. There is thus little or no possibility of damaging the factory applied finish on the exterior surface of the unit 30 during installation of the window assembly 10.

The exterior facing surface 124 of the flange 32 is intended to fit underneath the siding 18 to function as a flashing, and to this end is inclined and tapers toward the opposite rear surface 120, being closer thereto at its radially outermost edge. This allows for easier extraction of the unit 30 from the mold in which it is made and also enables the siding 18 to fit smoothly over the flange 32.

After the window assembly 10 is installed in the rough opening and secured in place, wooden interior trim pieces 130 and 132 (FIGS. 3 and 4) are installed. The trim piece 130 is of a thickness selected so that its interiormost surface 134 is coplanar with the surface 136 of the interior finished wall 19. In this way the trim piece 132 may lay flat against the interior wall surface and bridge the gap 138 between the window assembly 10 and interior wall. The inner perimeter surface 140 of trim piece 130 abuts directly against the outer periphery of the wooden sash 68, or against the gasket 80 if it is used. Further, an additional wooden trim piece (not shown) may be installed between trim pieces 130 and 132 if the wall is thicker than standard. Also, a mullion or trim piece 150 may be added to the inner perimeter surface of the sash 68 for decorative purposes.

It should be clear from the preceding description that the window assembly 10 presents an exterior surface of urethane which has an extremely durable finish. The exposed interior surfaces on the other hand are desirably made of wood to match the other woodwork within the building.

The window assembly 10 shown is semicircular and is designed to be installed over a rectangular window or door (not shown) to add a customized appearance. In such case, the flange 32 does not extend downward from the sill portion 34 of the unit 30 or otherwise it would interfere with the door or window therebelow. However, other shapes of window assemblies may also be made which embody the present invention, including oval, round, and octagonal window assemblies in which a flange may extend outward around their entire outer perimeter. As a further modification, the window assembly 10 may be provided with louvers or other inserts instead of glazing material 31.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A window assembly comprising an integrally molded sash, sill, frame and exterior trim unit formed of plastic, wooden interior trim parts fastened to the interior side of said unit, said integrally molded unit including an opening for receiving an insert, said opening being defined at least partially by a perimetric surface integrally formed with said unit and being in a vertical plane against which a marginal portion of the insert may abut, positioning means for accurately locating the insert with respect to said opening and including a lip integrally formed with said sill and sash and extending approximately perpendicular to the plane of said opening, a plurality of bosses extending interiorly of said perimetric surface, and fastening means for securing one of said trim parts to said unit in abutting engagement with said bosses.

2. A window assembly as set forth in claim 1 wherein said fastening means includes threaded fasteners which secure said one trim part directly to said bosses.

3. A window assembly as set forth in claim 2 wherein there are relieved areas between said bosses.

4. A window assembly as set forth in claim 1 wherein said bosses are positioned around the periphery of said opening for centering said insert in said opening.

5. A window assembly as set forth in claim 1 further comprising flange means integrally molded with and extending radially outwardly from the perimeter of said unit, said flange means having holes therethrough for receiving fasteners for securing said window assembly in an opening in an exterior wall.

6. A window assembly as set forth in claim 5 wherein said flange means extends continuously around at least half of the perimeter of said unit.

7. A window assembly as set forth in claim 6 wherein said flange means extends continuously around at least the upper half of the perimeter of said unit.

8. A window assembly comprising an integrally molded sash, sill, frame and exterior trim unit formed of plastic, said unit including surface means defining an opening for receiving glazing material, said surface means including a radially inwardly extending, interiorly facing perimetric surface integrally formed with said unit and disposed in a generally vertical plane against which a marginal portion of the glazing material abuts, an interiorly facing wooden sash, a plurality of bosses positioned around the periphery of said opening, said bosses including positioning means for centering said glazing material with respect to said opening, and means for fastening said wooden sash to said unit to clamp said glazing material between said inwardly facing perimetric surface and said wooden sash.

9. A window assembly as set forth in claim 8 wherein said wooden sash is fastened directly to said bosses.

10. A window assembly comprising an integrally molded sash, sill, frame and exterior trim unit formed of plastic, said unit including an opening for receiving an insert, said opening being defined at least partially by a radially inwardly extending, interiorly facing perimetric surface integrally formed with said unit and being in a vertical plane against which a marginal portion of the insert may abut, an interiorly facing wooden sash, a plurality of bosses extending interiorly of said perimetric surface, and fastening means for fastening said wooden sash to said unit from the interior side of said unit in abutting engagement with said bosses, said insert being clamped between said interiorly facing perimetric surface and said wooden ash.

11. A window assembly as set forth in claim 10 wherein said insert is glazing material, and there are groove means in said interiorly facing perimetric surface for receiving and sealingly engaging resilient caulking material to seal the glazing material in said opening when clamped between said interiorly facing perimetric surface and said wooden sash.

12. A window assembly as set forth in claim 10 including positioning means for accurately locating the insert and said wooden sash with respect to said opening and including a lip integrally formed with said integrally molded sill and sash and extending approximately perpendicular to the plane of said opening.

13. A window assembly as set forth in claim 10 further comprising flange means integrally molded with and extending radially outwardly from the perimeter of said unit, said flange means having holes therethrough for receiving fasteners for securing said window assembly in an opening in an exterior wall.

14. A window assembly as set forth in claim 13 wherein said flange means extends continuously around at least half of the perimeter of said unit.

15. A window assembly as set forth in claim 14 wherein said flange means extends continuously around at least the upper half of the perimeter of said unit.

16. A window assembly as set forth in claim 10 which is adapted to fit in an opening formed in an exterior wall which includes sheathing and siding applied over the sheathing, said window assembly further comprising flange means intergrally molded with and extending radially outward from the perimeter of said unit, said flange means being adapted to be received between the sheathing and siding for positioning said window assembly in such opening and for forming a weathertight seal between said window assembly and such wall, said flange means including a radially extending interior surface for flat engagement with the outer surface of the sheathing, and an inwardly tapered exterior surface to permit the siding to fit smoothly over said exterior surface.

17. A window assembly as set forth in claim 16 wherein said flange means has holes therethrough radially outward from the perimeter of said unit for receiving fasteners for securing said window assembly to such exterior wall, said holes and fasteners being covered by such siding.

18. A window assembly adapted to fit in an opening formed in an exterior wall which includes sheathing and siding applied over the sheathing, said window assembly comprising an integrally molded sash, sill, frame and trim unit, and flange means integrally molded with and extending radially outward from the perimeter of said unit, said flange means being adapted to be received between the sheathing and siding for positioning said window assembly in such opening and for forming a weathertight seal between said window assembly and such wall, said flange means including a radially extending interior surface for flat engagement with the outer surface of the sheathing, and an inwardly tapered exterior surface to permit the siding to fit smoothly over said exterior surface, the outer circumference of said unit having a plurality of substantially axially extending exterior surfaces spaced therearound for positioning said unit within such opening in such exterior wall, and relieved areas beteen said axially extending exterior surfaces to reduce the weight of said insert and save material costs.

* * * * *